(12) United States Patent
Kim (10) Patent No.: US 8,765,287 B2
(45) Date of Patent: Jul. 1, 2014

(54) BATTERY MODULE

(75) Inventor: Myung-Chul Kim, Yongin-si (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 235 days.

(21) Appl. No.: 13/335,230

(22) Filed: Dec. 22, 2011

(65) Prior Publication Data

US 2013/0040181 A1 Feb. 14, 2013

Related U.S. Application Data

(60) Provisional application No. 61/521,512, filed on Aug. 9, 2011.

(51) Int. Cl.
*H01M 2/02* (2006.01)
*H01M 10/50* (2006.01)

(52) U.S. Cl.
USPC .......................... 429/148; 429/120; 429/163

(58) Field of Classification Search
USPC ................... 429/120, 148, 149, 163
See application file for complete search history.

(56) References Cited

U.S. PATENT DOCUMENTS

| 2005/0170240 | A1 | 8/2005 | German et al. |
| 2005/0250386 | A1 | 11/2005 | Kim |
| 2009/0173559 | A1 | 7/2009 | Nakamura |
| 2009/0186265 | A1* | 7/2009 | Koetting et al. ............. 429/120 |
| 2010/0310909 | A1 | 12/2010 | Yun et al. |

FOREIGN PATENT DOCUMENTS

| KR | 10-2006-0104071 | 10/2006 |
| KR | 10-2007-0019839 A | 2/2007 |

OTHER PUBLICATIONS

European Search Report dated Nov. 7, 2012.

* cited by examiner

*Primary Examiner* — Tracy Dove
(74) *Attorney, Agent, or Firm* — Lee & Morse, P.C.

(57) ABSTRACT

A battery module includes a plurality of battery cells, and at least one barrier adjoining at least one of the battery cells. The barrier includes a plurality of linear members extending in a crosswise direction across the barrier, and a set of the linear members defining a sloping open area in the form of a passage that widens toward one lateral edge of the barrier.

16 Claims, 5 Drawing Sheets

BATTERY MODULE

CROSS REFERENCE TO RELATED APPLICATION

The present application claims priority under 35 U.S.C. §119(e) to U.S. Provisional Application No. 61/521,512, filed on Aug. 9, 2011, and entitled: "Battery Module," which is incorporated herein by reference in its entirety.

BACKGROUND

Generally, a secondary battery is a battery which can be repeatedly used through charging and discharging. A secondary battery that is formed of one battery cell may be used for, e.g., portable small-sized electronic devices, such as a mobile phone, a notebook, a computer, a camera, a camcorder, and the like. A second battery that is formed of a battery pack including a plurality of battery cells may be used for, e.g., a motor driving power supply for a high-output hybrid electric vehicle (HEV), an electric vehicle (EV), and the like.

SUMMARY

Embodiments may be realized by providing a battery module including a plurality of battery cells, and at least one barrier adjoining at least one of the battery cells. The barrier includes a plurality of linear members extending in a crosswise direction across the barrier, and a set of the linear members defining a sloping open area in the form of a passage that widens toward one lateral edge of the barrier.

The sloping open area may narrow toward a center of the sloping open area such that the sloping open area opens from a concentrated passage to form the passage that widens toward the one lateral edge of the barrier. The sloping open area may have varying distances between the set of the linear members such that distances between the set of the linear members increase as the passage widens toward the one lateral edge of the barrier. The distances between the set of the linear members may gradually decrease inwardly away from the one lateral edge of the barrier.

The sloping open area defined by the set of the linear members may include a first wide region that widens toward the one lateral edge of the barrier, a second wide region that widens toward another lateral edge of the barrier, and a narrow region between the first wide region and the second wide region. In the first wide region distances between the set of the linear members may increase toward the one lateral edge of the barrier, in the second wide region distances between the set of the linear members may increase toward the other lateral edge of the barrier, and in the narrow region a distance between the set of the linear members may be constant.

The sloping open area defined by the set of the linear members may include a first wide region that widens toward the one lateral edge of the barrier and a narrow region at another lateral edge of the barrier. In the first wide region distances between the set of the linear members may increase toward the one lateral edge of the barrier and in the narrow region a distance between the set of the linear members may be constant.

The sloping open area defined by the set of the linear members may narrow toward another lateral edge of the barrier. The plurality of battery cells and the at least one barrier may be alternately arranged along a first direction, and the first direction may intersect the crosswise direction of the linear members.

The barrier may include a plurality of sidewalls adjoining at least one of the battery cells, and one of the plurality of sidewalls may define the one lateral edge of the barrier. The plurality of battery cells and the at least one barrier may be alternately arranged along a first direction, and the plurality of sidewalls may extend between a pair of the plurality of battery cells in the first direction.

The plurality of battery cells and the at least one barrier may be alternately arranged along a first direction, and the plurality of sidewalls may extend toward only one of the plurality of battery cells in the first direction. The one of the plurality of sidewalls may include a main aperture therein providing communication between the sloping open area and an exterior of the barrier. Other sets of the linear members may define other open areas extending in the crosswise direction across the barrier. The one of the plurality of sidewalls may include a plurality of secondary apertures providing communication between the other open areas and the exterior of the barrier. An area of the main aperture may be greater than areas of the secondary apertures.

Embodiments may also be realized by providing a battery module including a plurality of battery cells and at least one barrier. The barrier is between adjacent battery cells of the plurality of battery cells and includes a plurality of linear members extending in a crosswise direction across the barrier. A set of the linear members defines a first passageway and a second passageway connected to the first passageway, and the second passageway is narrower than the first passageway such that flow between the set of the linear members is concentrated in the second passageway.

The first passageway may widen toward one lateral edge of the barrier. The set of the linear members may define a third passageway connected to the second passageway, and the second passageway may be between the first and third passageways. The third passageway may widen toward another lateral edge of the barrier. The first passageway may widen toward one lateral edge of the barrier and the second passageway may be at another lateral edge of the barrier. The first passageway may widen toward one lateral edge of the barrier and the second passageway may be at a center of the barrier.

Embodiments may also be realized by providing a battery module including a plurality of battery cells arranged in one direction and a barrier interposed between the battery cells. The barrier includes a plurality of linear members, a plurality of openings disposed between neighboring linear members, and a first side member and a second side member connected to one end and an opposite end of the linear members, respectively. Among the plurality of openings, a center opening at a center of the barrier has a slope part having a slope that becomes narrower or wider from the one end or the opposite end to the center of the barrier.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements may be exaggerated for clarity of illustration. It will also be understood that when an element is referred to as being "on" another element, it can be directly on the other element or intervening elements may also be present. When an element is referred to as being "connected to" another element, it can be directly connected to the other element or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout. Also, description of unnecessary parts or elements may be omitted for clarity and conciseness.

Hereinafter, exemplary embodiments will be described in detail with reference to the accompanying drawings.

Figure 1:
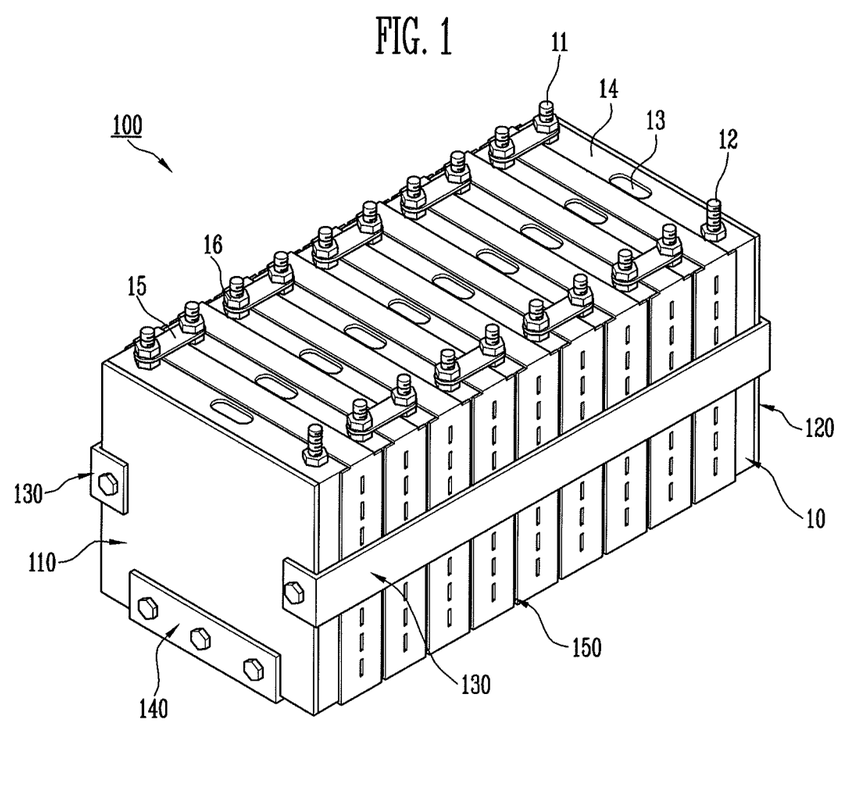
FIG. 1 illustrates a schematic perspective view of a battery module, according to an exemplary embodiment.
Figure 2:
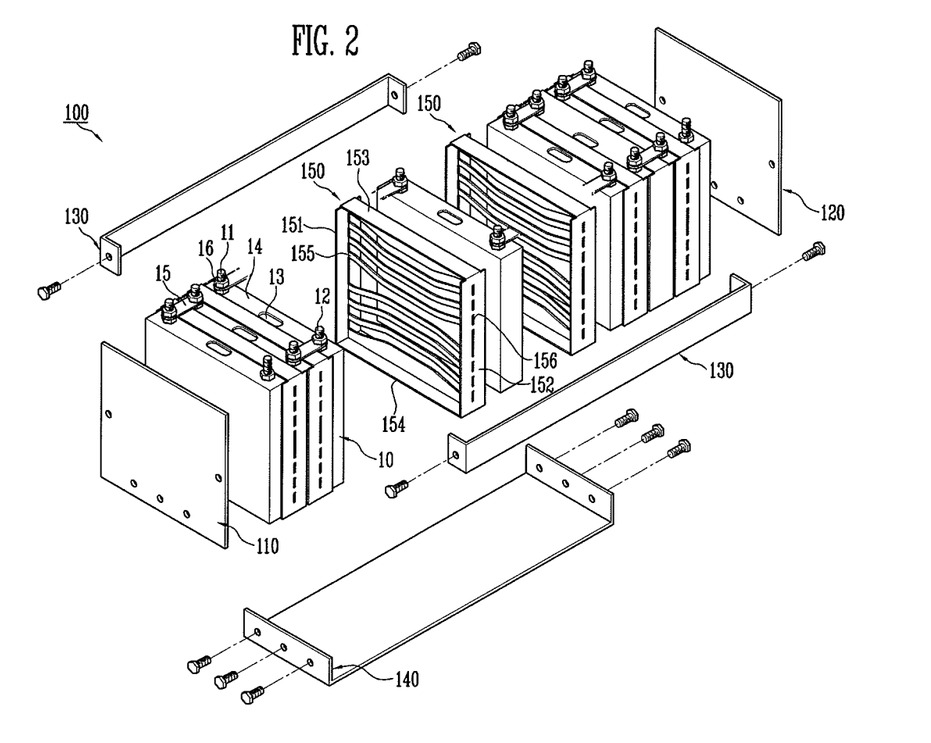
FIG. 2 illustrates an exploded perspective view of the battery module of FIG. 1.
Figure 3:
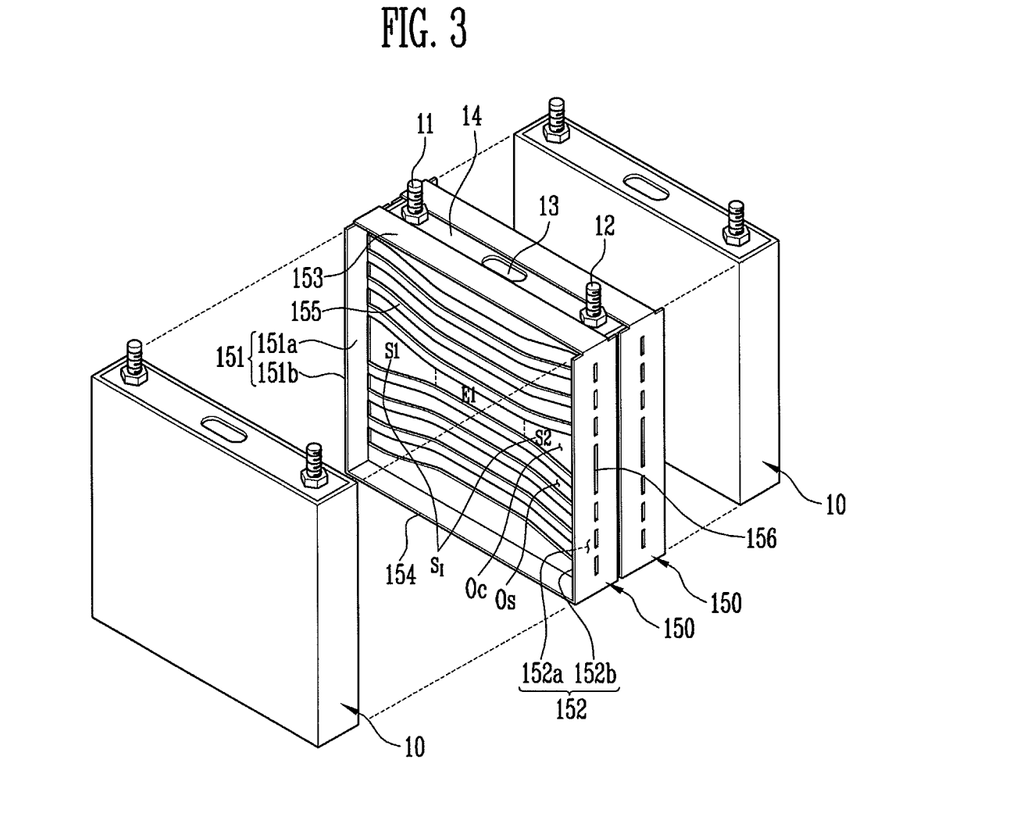
FIG. 3 illustrates a perspective view of a barrier interposed between battery cells, according to an exemplary embodiment.
Figure 4A:
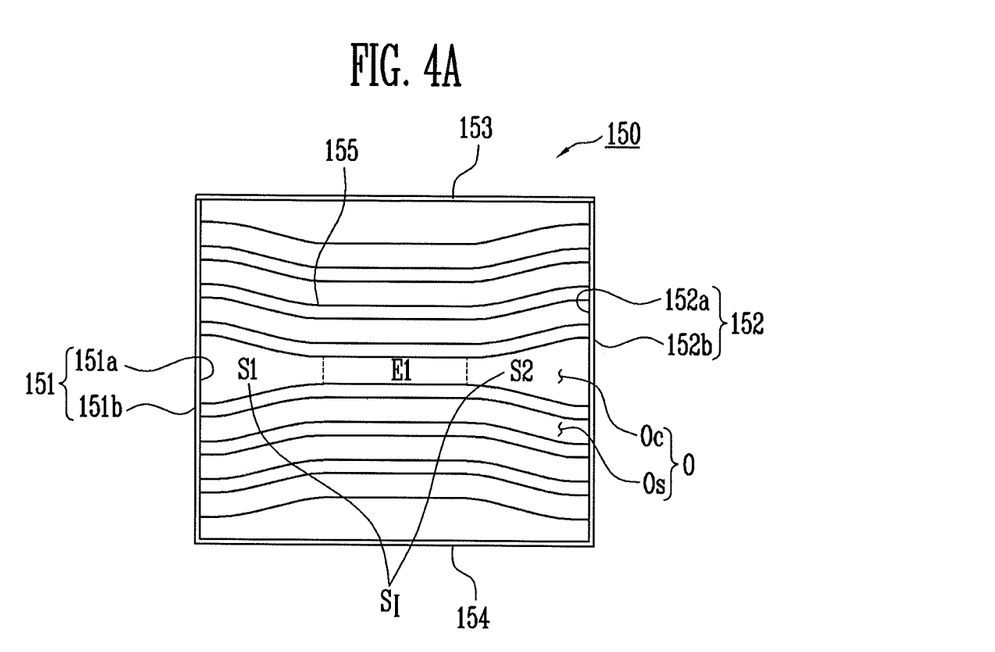
FIGS. 4A, 4B, and 4C illustrate front views of barriers, according to exemplary embodiments.
Figure 4B:
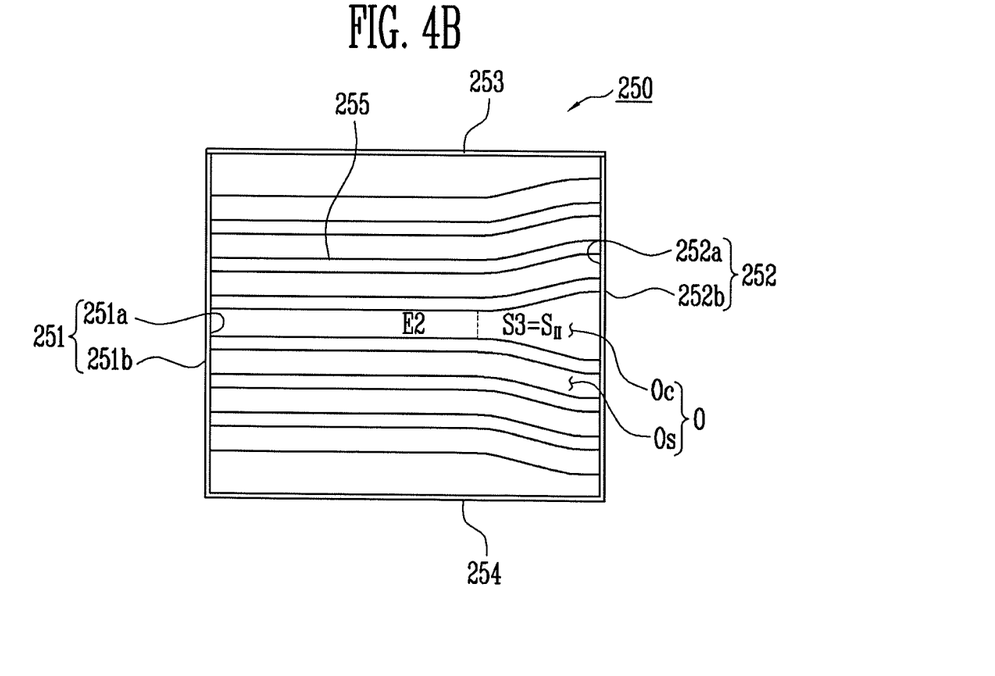
Figure 4C:
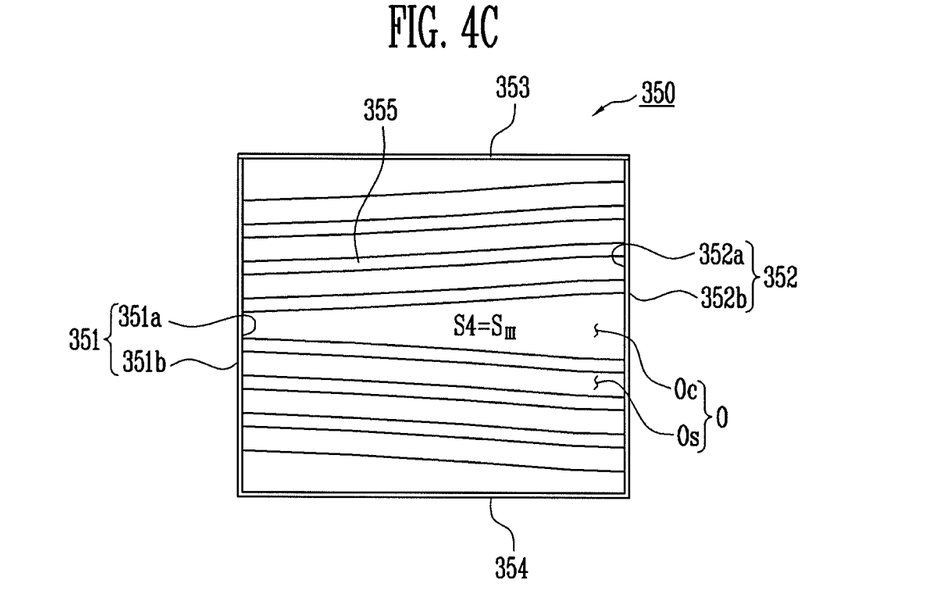
Figure 5:
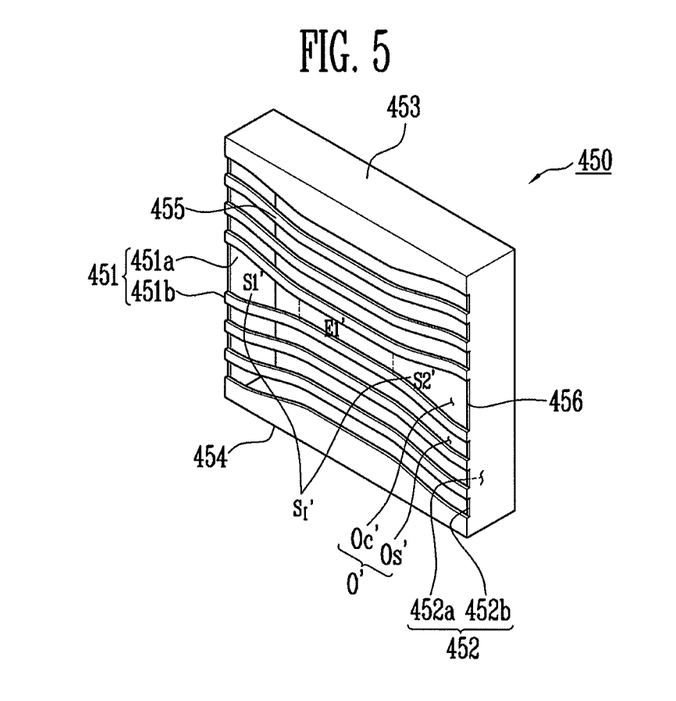
FIG. 5 illustrates a perspective view of a barrier, according to an exemplary embodiment.

FIG. 1 illustrates a schematic perspective view of a battery module according to an exemplary embodiment, FIG. 2 illustrates an exploded perspective view of the battery module of FIG. 1, and FIG. 3 illustrates a perspective view of a barrier interposed between battery cells according to the embodiment. FIG. 4A illustrates a front view of a barrier according to a first exemplary embodiment, FIG. 4B illustrates a front view of a barrier according to a second exemplary embodiment, and FIG. 4C illustrates a front view of a barrier according to a third exemplary embodiment. FIG. 5 illustrates a perspective view of a barrier according to another exemplary embodiment.

Referring to FIGS. 1 to 3, a battery module 100, according to an exemplary embodiment, may include a plurality of battery cells 10 arranged in a first direction. The battery module 100 may include at least one barrier 150 arranged in the first direction and interposed between adjacent battery cells 10 arranged in the first direction. For example, the plurality of battery cells 10 and a plurality of barriers 150 may be alternately arranged in the first direction such that each of the barriers 150 adjoins at least one of the battery cells 10.

According to an exemplary embodiment, the barrier 150 may include a plurality of linear members 155 and a plurality of openings O disposed between neighboring linear members 155. The linear members 155 in the barrier 150 may be arranged in a second direction, e.g., the second direction may be perpendicular to the first direction. For example, the first direction may intersect the crosswise direction of the linear members 155. The linear members 155 may have a wavy shape in the crosswise direction, e.g., the linear members 155 may be curved and/or bent in a direction extending across adjacent battery cells 10.

The barrier 150 may include a plurality of sidewalls adjoining at least one adjacent battery cell 10, e.g., each sidewall may adjoin lateral sides of two adjacent battery cells 10. The plurality of sidewalls may define lateral edges of the barrier 150. For example, the sidewalls of the barrier 150 may include a first side member 151 and a second side member 152 connected to opposing ends of the linear members 155, e.g., the first and second side members 151 and 152 may extend in the second direction so as to be connected to each of the linear members 155 in the second direction. Each of the openings O may be defined by at least one of the linear members 155, the first side member 151, and the second side member 152. The first and second side members 151 and 152 may overlap lateral sides of both adjacent battery cells 10.

The sidewalls of the barrier 150 may also include a third side member 153 and a fourth side member 154 connected to both the first side member 151 and the second side member 152. For example, the third side member 153 may be connected to upper sides of the first side member 151 and the second side member 152. The third side member 153 may abut upper sides of adjacent battery cells 10. The fourth side member 154 may be connected to lower sides of the first side member 151 and the second side member 152. The fourth side member 154 may abut lower sides of the adjacent battery cells 10. The third and fourth side members 153 and 154 may overlap the upper and lower sides, respectively, of both adjacent battery cells 10.

At least one of the plurality of sidewalls of the barrier 150 may include apertures 156. The sidewalls of the barrier 150 may include the apertures 156 therein for, e.g., providing communication between corresponding openings O and the exterior of the barrier 150. For example, the first and second side members 151 and 152 may both include apertures 156 corresponding to the placement of the openings O therebetween. The first and second side members 151 and 152 may include a plurality of apertures 156 and each aperture 156 may correspond to, e.g., overlap, one of the openings O.

The sidewalls may include at least one main aperture 156 and at least one secondary aperture 156. The main aperture 156 may correspond to an opening O having a sloping open area, e.g., a center opening Oc. A plurality of secondary apertures 156 may correspond to other open areas, e.g., side openings Os. A size of the aperture 156 may correspond to a size of the corresponding opening O, e.g., the greater a size of a region of the opening O adjacent to the sidewall the greater the size of the corresponding aperture 156 in the sidewall. For example, an area of the main aperture 156 may be greater than areas of the secondary apertures 156. The areas of the secondary apertures 156 may be the same, according to an exemplary embodiment.

Among the openings O in the barrier 150, one of the openings O may be the center opening Oc that is disposed at and/or near a center of the barrier 150. The center opening Oc may be defined by a set of neighboring linear members 155. The center opening Oc may have at least one slope part $S_f$ so that, e.g., the linear members 155 have a wavy, bent, and/or curved shape. For example, the slope part $S_f$ may form a region of the center opening Oc in which a width of the center opening Oc is varied in the second direction. Other openings O, e.g., the side openings Os, may be disposed above or below the center opening Oc. The other openings O may exclude the slope part $S_f$, e.g., may have a constant width in the second direction.

According to an exemplary embodiment, the set of the linear members 155 defining the center opening Oc may define at least a first passageway and a second passageway connected to the first passageway. The second passageway may be narrower than the first passageway so that flow between the set of the linear members 155 is concentrated in the second passageway. For example, the sloping open area of one of the openings O, e.g., the center opening Oc, in the barrier 150 may include the slope part $S_f$ that narrows toward a center of the opening O so that the slope part $S_l$ of the sloping open area opens from a concentrated passage E1 to form the passage that widens toward at least one of the lateral edges of the barrier 150. The sloping open area may have varying distances between the set of the linear members 155 so that distances between the set of the linear members 155 may increase as the passage widens toward at least one of the lateral edges of the barrier 150. The distances between the set of the linear members 155 may gradually decrease inwardly away from one lateral edge of the barrier 150, e.g., in a direction toward the center of the opening O, according to an exemplary embodiment. The distances between the set of the linear members 155 may decrease more rapidly in an area further away from the lateral edge of the barrier 150.

Referring to FIG. 4A, according to the first exemplary embodiment, the sloping open area, e.g., the sloping part $S_l$, may have a first slope part S1 and a second slope part S2 defined by the set of linear members 155. The first slope part S1 may have a first slope that becomes narrower in a direction toward the center of the opening O, e.g., the center opening Oc, from the first side member 151. The first slope part S1 may gradually decrease in width near the first side member 151. The first slope part S1 may have a greater decrease in width at a distance away from the first side member 151. The second slope part S2 may have a second slope that becomes narrower in a direction toward the center of the opening O, e.g., the center opening Oc, from the second side member 152. The opening O, e.g., center opening Oc, may include a first even part E1 between the first slope part S1 and the second slope part S2. The first even part E1 may connect, e.g., provide fluid connection between, the first slope part S1 and the second slope part S2. A center of the center opening Oc may include the first even part E1.

According to an exemplary embodiment, the first slope part S1 may be a first wide region that widens toward one lateral edge of the barrier 150. The second slope part S2 may be a second wide region that widens toward another lateral edge of the barrier. The first even part E1 may be a narrow region, e.g., a region having a constant width, between the first wide region of the first slope part S1 and the second wide region of the second slope part S2. In the first wide region of the first slope part S1, distances between the set of the linear members 155 may increase toward the one lateral edge of the barrier 150, e.g., toward the first side member 151. In the second wide region of the second slope part S2 distances between the set of the linear members 155 may increase toward the other lateral edge of the barrier, e.g., toward the second side member 152. In the narrow region of the first even part E1 a distance between the set of the linear members 155 may be substantially constant, e.g., the first even part E1 may exclude the slope part $S_l$.

The first slope part S1 may define a first passageway, e.g., a heat transfer medium entrance passageway connected to the main aperture 156 in the first side member 151, that widens toward one lateral edge of the barrier 155. The second slope part S2 may define a third passageway, e.g., a heat transfer medium exist passageway connected to the main aperture 156 in the second side member 152. The third passageway may widen toward the second side member 152. The first even part E1 may define a second passageway, e.g., a concentrated heat transfer medium passageway, between the first and third passageways. However, embodiments are not limited thereto, e.g., the arrangement and/or the number of the passageways may be varied. According to an exemplary embodiment, the first slope and the second slope may have the same size, e.g., the first slope and the second slope may be symmetric with respect to each other. The first even part E1 may have a uniform width directly between the first slope part S1 and the second slope part S2 so that the opening O, e.g., the center opening Oc, may be symmetric with respect to a centerline thereof.

Others of the plurality of linear members 155 may be sequentially provided above and/or below the center opening Oc to define the other openings O, e.g., the side openings Os, of the barrier 150. For example, other sets of the linear members 155 may define the side openings Os extending in the crosswise direction across the barrier 150. The other openings O may have a uniform width. For example, the linear members 155 may have complimentary wavy, bent, and/or curved shapes so that the width of the other openings O is uniform. However, embodiments are not limited thereto, e.g., the linear members 155 may also be formed in various shapes depending on purposes. Opposing ends of the other openings O may correspond to apertures 156 on the first and second side members 151 and 152.

According to an exemplary embodiment, a plurality of the side openings Os may be formed on the opposite sides of the center opening Oc, in which each of the side openings Os may have a uniform width but may be formed in various shapes depending on shapes of the linear members 155 and purposes. For example, the shape of the side openings Os may be varied depending on the shape of the set of linear members 155 defining the center opening Oc. The linear members 155 defining side openings Os above the center opening Oc may each have a curved pattern and/or shape corresponding to the upper linear member 155 of the set of linear members 155 defining the center opening Oc. The linear members 155 defining side openings Os below the center opening Oc may each have a curved pattern and/or shape corresponding to the lower linear member 155 of the set of linear members defining the center opening Oc.

The barrier 150 including the plurality of linear members 155 may be disposed between neighboring battery cells 10 to accommodate the battery cells on opposite sides. For example, the plurality of linear members 155 may be connected to, e.g., in direct contact with, to a first internal side 151a of the first side member 151. The first internal side 151a may oppose a second external side 151b of the first side member 151 so that the second external side 151b faces the exterior of the barrier 150. Opposing ends of the plurality of linear members 155 may be connected to, e.g., in direct contact with, a first internal side 152a of the second side member 151. The first internal side 152a may oppose a second external side 152b of the second side member 152 so that the second external side 152b faces the exterior of the barrier 150. The first and second side members 151 and 152 may be in contact with the at least one battery cell 10 that is adjacent thereto. The plurality of linear members 155 may be positioned, e.g., attached, near a centerline of the first internal side 151a and near a centerline of the second internal side 152a.

According to an exemplary embodiment, based on features of the barrier 150, the openings O (Oc and Os) may be disposed between the battery cells 10. The openings O may function as a passage to discharge heat, e.g., by way of providing flow passageways for a heat transfer medium, so that heat generated from the battery cells 10 may not accumulate within the battery module 100. For example, the heat may be generated during a plurality of charging and discharging processes in the individual battery cells 10. The openings O may define the passage for the heat transfer medium to cool or heat the battery cells 10 adjacent to the openings O.

According to an exemplary embodiment, the heat transfer medium may be introduced at one side of the battery module 100, e.g., through one of the apertures 156 of the barrier 150.

Thereafter, the heat transfer medium may exchange heat with the surrounding environment, e.g., at least one adjacent battery cell 10, while passing through the openings O provided in the barrier 150. For example, the heat transfer medium may come into direct contact with a wider side of the battery cells 10. Then, after passing through the openings O, the heat transfer medium may be discharged through another side of battery module 100, e.g., through one of the apertures 156 of the barrier 150 at an opposing side of where the heat transfer medium was introduced to the battery module 100. Accordingly, the battery cells 10 of the battery module 100 may be configured to maintain a predetermined temperature.

The heat transfer medium, e.g., which may be a fluid, may increase in speed when flowing through a narrow passage and may decrease in speed when flowing through a wide passage. Thus, according to an exemplary embodiment, the heat transfer medium may have a higher speed in the first even part E1 than in the first slope part S1 and the second slope part S2. As such, the varying shape of ones of the openings O, e.g., the varying width of the center opening Oc, may be applied for efficient cooling and/or heating of the battery cells 10. For example, when heat discharged from the battery cells 10 is concentrated on a center part of the battery cells 10, speed of the heat transfer medium may be higher in the first even part E1 corresponding to the center part of the battery cells 10 than in the first slope part 51 and the second slope part S2. Accordingly, efficient heat transfer between the transfer medium and the battery cells 10 within a short time may occur, e.g., cooling or heating may occur within a short time. Heat exchange efficiency of the battery cells 10 may be improved, e.g., so that a smaller amount of a heat transfer medium is needed, thereby reducing production costs.

The battery cells 10 may be manufactured by accommodating an electrode assembly (not shown) and an electrolyte in a battery case, and then sealing the battery case with a cap assembly 14. The cap assembly 14 may include a positive terminal 11 and a negative terminal 12, e.g., arranged at opposing sides of the cap assembly 14. The cap assembly may include a vent 13 disposed between the positive terminal 11 and the negative terminal 12. The electrode assembly may include, e.g., a positive plate (not shown), a negative plate (not shown), and a separator (not shown) disposed between the positive and negative plates. The positive plate may be connected to the positive terminal 11 and the negative plate may be connected to the negative terminal 12. Accordingly, energy generated by an electrochemical reaction between the electrode assembly and the electrolyte may be transmitted to the outside of the battery case. The vent 13 may function as a passage through which gas generated in the battery cell 10 is discharged to the outside.

A housing may fix together the plurality of battery cells 10 and the at least one barrier 150 to form the battery module 100. The housing may include a pair of first and second end plates 110 and 120 disposed outside the battery cells 10, e.g., disposed adjacent to outermost battery cells 10 in the battery module 100. For example, the first and second end plates 110 and 120 may be disposed to be in surface contact with outermost battery cells 10 at opposing sides of the battery module 100. The first and second end plates 110 and 120 may press the plurality of battery cells 10 inwards. A plurality of connecting members may connect the first and second end plates 110 and 120 to each other. However, embodiments are not limited thereto.

The first and second end plates 110 and 120 and the connecting members may form a space to accommodate the plurality of battery cells 10 and the at least one barrier 150 in the battery module 100. For example, the battery cells 10 may be arranged in the first direction in the formed space. The battery cells 10 may be arranged side by side, e.g., with wider front sides facing each other in the first direction.

The positive terminals 11 and/or the negative terminals 12 of two neighboring battery cells 10 may be electrically connected through bus bars 15, e.g., as illustrated in FIG. 2. The bus bars 15 may include holes through which corresponding positive terminals 11 and/or the negative terminals 12 pass through. For example, each bus bar 15 may be connected to a positive terminal 11 of one battery cell 10 and to a negative terminal 12 of a neighboring battery cell 10. The bus bars 15 connected to the corresponding positive terminals 11 and/or the negative terminals 12 passing through the holes may be fixed by a nut 16 or the like. Accordingly to an exemplary embodiment, the battery cells 10 supported by the first and second end plates 110 and 120 may be arranged so that the positive terminals 11 and the negative terminals 12 may be alternately disposed. For example, the neighboring terminals 11 and 12 of the battery cells 10 may be connected in series.

The plurality of connecting members may include side brackets 130, e.g., a pair of side brackets 130, extending along the first direction across the plurality of battery cells and the at least one barrier 150. The side brackets 130 may support opposite lateral sides of the battery cells 10, e.g., each side bracket 130 may be disposed on opposing sides of the battery cells 10. One of the side brackets 130 may overlap each of the first side members 151 of the barriers 150 in the battery module 100 and another of the side brackets 130 may overlap each of the second side members 152 of the barriers 150 in the battery module 100. A bottom bracket 140 may extend along the first direction across a bottom side of the battery module 100 so as to support bottom sides of the battery cells 10. The bottom bracket 140 may overlap each of the fourth side members 154 of the barriers 150 in the battery module 100.

One end portions of each of the pair of side brackets 130 and the bottom bracket 140 may be respectively coupled with the first end plate 110, and opposing end portions thereof may be coupled with the second end plate 120. Accordingly, the first and second end plates 110 and 120 may be connected to each other by the pair of side brackets 130 and the bottom bracket 140. According to an exemplary embodiment, coupling between the plurality of connecting members and the first and second end plates 110 and 120 may be made through a bolt and a nut. However, embodiments are not limited thereto, e.g., other connection means may be used.

The first and second end plates 110 and 120, the pair of side brackets 130, and the bottom bracket 140 may be provided to stably fix the battery cells 10. However, embodiments are not limited thereto, e.g., the components for fixing the battery cells 10 and arrangement of the components may be modified variously without being limited to a configuration in the present embodiment. Further, a connection structure, a number of battery cells 10, and/or a number of barriers 150 may be changed based on a design of the battery module 100.

Referring to FIG. 4B, the modified barrier 250 according to the second embodiment, may include a slope part $S_{II}$. The barrier 250 may be incorporated into the battery module 100 discussed above, according to an exemplary embodiment. The barrier 250 may be similar to the barrier 150, e.g., the barrier 250 may include a plurality of openings O defined by a plurality of linear members 255. The barrier 250 may include a plurality of sidewalls adjoining at least one adjacent battery cell 10. For example, the barrier 250 may include a first side member 251, a second side member 252, a third side member 253, and a fourth side member 254. Ends of the plurality of linear members 255 may be connected to a first internal side 251a of the first side member 251 and opposing ends of the linear members 255 may be connected to a second internal side 252a of the second side member 252. A first external side 251b of the first side member 251 and a second external side 252b of the second side member 252 may face the exterior of the barrier 250.

The slope part $S_{II}$ of the barrier 250 may include a third slope part S3. The third slope part S3 may be substantially the same as or similar to the first and second slope parts S1 and S2 of the barrier 150. The third slope part S3 may have a third slope that becomes narrower in a direction toward the center of the opening O, e.g., the center opening Oc, from the second side member 252. However, embodiments are not limited thereto, e.g., the third slope part S3 may become narrower toward the center of the opening O from the first side member 251. A second even part E2 may be connected to the third slope part S3 to form one opening O, e.g., the center opening Oc, in the barrier 250. The second even part E2 may be similar to the first even part E1 of the barrier 150. The second even part E2 may have, e.g., a uniform width from one end at which the first side member 251 is disposed to the third slope part S3.

According to an exemplary embodiment, the center opening Oc of the barrier 250 may include a sloping open area defined by a set of the linear members 255. The sloping open area may include a first wide region, e.g., the third slope part S3, that widens toward the one lateral edge of the barrier, e.g., the second side member 252. The center opening Oc may also include a narrow region, e.g., the second even part E2, at another lateral edge of the barrier, e.g., the first side member 251. In the first wide region distances between the set of the linear members 255 may increase toward one lateral edge of the barrier and in the narrow region a distance between the set of the linear members may be substantially constant. A center of the center opening Oc may include the second even part E2.

As in the first embodiment, the set of the linear members 255 may define the center opening Oc. Other sets of the plurality of linear members 255 may be sequentially provided above and/or below the set of linear members 255 to define side openings Os. The side openings Os may have a uniform width. The linear members 255 may be formed in various shapes depending on purposes. Further, the side openings Os formed in a space between the plurality of linear members 255, e.g., at opposing sides of the center opening Oc, may have a uniform width but may be formed in various shapes depending on shapes of the linear members 255 and purposes.

The heat transfer medium, e.g., which may be a fluid, may increase in speed when flowing through a narrow passage and may decrease in speed when flowing through a wide passage. Thus, according to an exemplary embodiment, the heat transfer medium may have a higher speed in the second even part E2 than in the third slope part S3. As such, the varying shape of ones of the openings O, e.g., the varying width of the center opening Oc, may be applied for efficient cooling and/or heating of the battery cells 10.

Referring to FIG. 4C, the modified barrier 350 according to the third exemplary embodiment, may include a slope part $S_{III}$. The barrier 350 may be incorporated into the battery module 100 discussed above, according to an exemplary embodiment. The barrier 350 may be similar to the barriers 150 and 250, e.g., the barrier 350 may include a plurality of openings O defined by a plurality of linear members 355. The barrier 350 may include a plurality of sidewalls adjoining at least one adjacent battery cell 10. For example, the barrier 350 may include a first side member 351, a second side member 352, a third side member 353, and a fourth side member 354. Ends of the plurality of linear members 355 may be connected to a first internal side 351a of the first side member 351 and opposing ends of the linear members 355 may be connected to a second internal side 352a of the second side member 352. A first external side 351b of the first side member 351 and a second external side 352b of the second side member 352 may face the exterior of the barrier 350.

The slope part $S_{III}$ may include a fourth slope part S4. The fourth slope part S4 may define the entire opening O, e.g., the center opening Oc. The fourth slope part S4 may have a fourth slope that becomes wide from one end at which the first side member 351 is disposed to another end at which the second side member 352 is disposed. Accordingly, the sloping open area defined by a set of the linear members 355 that narrow toward an opposing lateral edge of the barrier 350. For example, the width of the center opening Oc may gradually increase, e.g., linearly increase, from the first side member 351 to the second side member 352 or may gradually decrease from the first side member 351 to the second side member 352. The width of the center opening Oc adjacent to the second side member 352 may gradually increase similar to the second slope part S2 in the barrier 150.

As in the first and second embodiments, the set of linear members 355 may define the center opening Oc. Other sets of the plurality of linear members 355 may be sequentially provided on opposite sides of the set of linear members 355 to define side openings Os. The side openings Os may have a uniform width. The linear members 355 may also be formed in various shapes depending on purposes, e.g., the linear members 355 may have an inclined shape. Further, the side openings Os formed in a space between the plurality of linear members 355, e.g., at opposing sides of the center opening Oc, may have a uniform width in which the side openings Os may have a uniform width but may be formed in various shapes depending on shapes of the linear members 355 and purposes.

The heat transfer medium, e.g., which may be a fluid, may increase in speed when flowing through a narrow passage and may decrease in speed when flowing through a wide passage. Thus, according to an exemplary embodiment, the speed of the heat transfer medium in the fourth slope part S4 may be higher in the one end at which the first side member 351 is disposed than in the other end at which the second side member 352 is disposed. For example, the speed of the heat transfer medium may gradually change from one end of the opening O, e.g., the center opening Oc, to another end of the opening O. As such, the varying shape of ones of the openings O, e.g., the varying width of the center opening Oc, may be applied for efficient cooling and/or heating of the battery cells 10.

As in the first to third embodiments, the slope parts $S_I$, $S_{II}$, and $S_{III}$ may be formed in a curved line. However, embodiments are not limited thereto, e.g., the slope parts $S_I$, $S_{II}$, and $S_{III}$ may be formed in straight lines. For example, the slope part $S_{III}$ may be formed of a set of straight lines disposed at an incline. The slope parts $S_I$ and $S_{II}$ may be formed by a set of a series of straight lines forming various shapes.

Referring to FIG. 5, unlike the barriers 150, 250, and 350 according to the first to third embodiments that may accommodate a pair of adjacent the battery cells 10 on the opposing sides of the barriers 150, 250, and 350, the barrier 450 according to the fourth exemplary embodiment may accommodate a single battery cell 10 on one side of the barrier 450. For example, the barrier 450 may include a plurality of linear members 455. The linear members 455 may be surrounded by a plurality of sidewalls. The plurality of sidewalls may include a first side member 451, a second side member 452, a third side member 453, and a fourth side member 454. The battery cell 10 may be disposed adjacent to the linear members 455 and/or seated inside the plurality of sidewalls.

The linear members 455 may be connected to a lateral edge of a first external side 451b of the first side member 451 and to a lateral edge of a second external side 452b of the second side member 452. A first internal side 451a of the first side member 451 and a second internal side 452a of the second side member 452 may both face the interior of the barrier 450, e.g., may face lateral sides of a battery cell 10.

Among a plurality of openings O', a center opening Oc' may be arranged near and/or at a center of the barrier 450. According to an exemplary embodiment, at least one of the openings O, e.g., the center opening Oc', may have a slope part $S_f$. However, embodiments are not limited thereto, e.g., the center opening Oc' may have various shapes according to the exemplary embodiments discussed above.

The slope part $S_f$, may include a first slope part S1' and a second slope part S2'. The first slope part S1' may have a first slope that becomes narrower in a direction toward the center of the opening O', e.g., the center opening Oc', from the first side member 451. The second slope part S2' may have a second slope that becomes narrower in a direction toward the center of the opening O, e.g., the center opening Oc', from the second side member 452. According to an exemplary embodiment, the first slope and the second slope may have the same size. A first even part E1' may connect the first slope part S1' to the second slope part S2'. The first even part E1' may have a uniform width between the first slope part S1' and the second slope part S2'. The slope part $S_f$, may be formed by straight lines or in curved lines.

At least one of the plurality of sidewalls of the barrier 450 may include apertures 456. For example, the sidewalls of the barrier 450 may include the apertures 456 therein for, e.g., providing communication between corresponding openings O' and the exterior of the barrier 450. For example, the first and second side members 451 and 452 may both include apertures 464 corresponding to the placement of the openings O', e.g., the center opening Oc' and side openings Os'. The first and second side members 451 and 452 may include at least one main aperture 456 and at least one secondary aperture 456. An area of the main aperture 456 may be greater than an area of the secondary apertures 456. A plurality of the secondary apertures 456 may have areas that are the same, according to an exemplary embodiment.

A set of the linear members 455 that define one of the openings O', e.g., the center opening Oc', may define at least a first passageway and second passageway connected to the first passageway. The first and second passageways may provide a flow path for the flow of the heat transfer medium therethrough. The second passageway may be narrower than the first passageway so that flow between the set of linear members 455 is concentrated in the second passageway.

Others of the plurality of linear members 455 may be sequentially provided on above and/or below the center opening Oc' to define the other openings O', e.g., the side openings Os'. The side openings Os' may have a uniform width. The side openings Os' may be formed in a space between the other of the plurality of linear members 455 formed on the opposite sides based on the center opening Oc'. However, embodiments are not limited thereto, e.g., the linear members 455 may also be formed in various shapes depending on purposes.

A heat transfer medium, e.g., which may be a fluid, may increase in speed when flowing through a narrow passage and may decrease in speed when flowing through a wide passage. Thus, according to an exemplary embodiment, the heat transfer medium may have a higher speed in the first even part E1' than in the first slope part S1' and the second slope part S2'. As such, the varying shape of ones of the openings O', e.g., the varying width of the center opening Oc', may be applied for efficient cooling and/or heating of the battery cells 10.

In the first to fourth embodiments, the linear members 155, 255, 355, and 455 may be formed so as not to seal and/or hinder the function of the vent 13, which may be a discharge passage of gas from the plurality of battery cells 10. For example, the vent 13 may function as a discharge passage of gas from the battery cells 10 when pressure of gas generated in the battery cells 10 is at predetermined level or higher. As such, the vent may reduce the possibility of and/or prevent damage of the battery cells 10 due to, e.g., internal pressure.

Heat discharged from the battery cells 10, according to an exemplary embodiment of a battery module 100, may be concentrated on the center part of the battery cells 10. However, embodiments are not limited thereto, e.g., the heat discharged may be concentrated at a lateral part of the battery cells 10. In this regard, according to exemplary embodiments, a battery module may be designed such that a speed of a heat transfer medium becomes high in an area on which heat discharged from the battery cells 10 is concentrated. At least one opening O may be formed in a barrier corresponding to an area on which heat from battery cells is concentrated such that speed of a heat transfer medium increases, thereby the battery cells within may be effectively cooled a short time. Further, heat exchange efficiency of the battery cells may be improved, so that a smaller amount of a heat transfer medium is used, thereby reducing production costs.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

By way of summation and review, battery modules used for high-output motor driving power supplies may generate a great amount of heat by, e.g., charging and discharging operations. Such heat may deteriorate the battery cells in the battery modules.

Embodiments, e.g., the exemplary embodiments discussed above, relate to a battery module having a structure that allows for enhanced heat discharge properties. Embodiments may relate to reducing production costs by improving heat exchange efficiency of the battery cells so that a smaller amount of a heat transfer medium may be used. Embodiments may also relate to improving a cooling efficiency of a battery module and/or pack so that battery cells may not be easily deteriorated by repeatedly performing charging and discharging operations. Embodiments may also relate to concentrating a flow of heat transfer medium in certain areas to, e.g., effectively cool the battery cells within a short time. For example, embodiments may include an opening formed in a barrier corresponding to an area in which heat from battery cells is concentrated such that a speed of a heat transfer medium increases in the area.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of battery cells; and
   at least one barrier adjoining at least one of the battery cells, the barrier including:
   a plurality of linear members extending in a crosswise direction across the barrier,
   a set of the linear members defining a sloping open area in the form of a passage that widens toward one lateral edge of the barrier, and
   a plurality of sidewalls adjoining at least one of the battery cells, one of the plurality of sidewalls defining the one lateral edge of the barrier,
   wherein:
   the one of the plurality of sidewalls includes a main aperture therein providing communication between the sloping open area and an exterior of the barrier,
   other sets of the linear members define other open areas extending in the crosswise direction across the barrier, and
   the one of the plurality of sidewalls includes a plurality of secondary apertures providing communication between the other open areas and the exterior of the barrier, an area of the main aperture being greater than areas of the secondary apertures.

2. The battery module as claimed in claim 1, wherein the sloping open area narrows toward a center of the sloping open area such that the sloping open area opens from a concentrated passage to form the passage that widens toward the one lateral edge of the barrier.

3. The battery module as claimed in claim 1, wherein the sloping open area has varying distances between the set of the linear members such that distances between the set of the linear members increase as the passage widens toward the one lateral edge of the barrier.

4. The battery module as claimed in claim 3, wherein the distances between the set of the linear members gradually decrease inwardly away from the one lateral edge of the barrier.

5. The battery module as claimed in claim 1, wherein the sloping open area defined by the set of the linear members includes a first wide region that widens toward the one lateral edge of the barrier, a second wide region that widens toward another lateral edge of the barrier, and a narrow region between the first wide region and the second wide region.

6. The battery module as claimed in claim 5, wherein, in the first wide region distances between the set of the linear members increase toward the one lateral edge of the barrier, in the second wide region distances between the set of the linear members increase toward the other lateral edge of the barrier, and in the narrow region a distance between the set of the linear members is constant.

7. The battery module as claimed in claim 1, wherein the sloping open area defined by the set of the linear members includes a first wide region that widens toward the one lateral edge of the barrier and a narrow region at another lateral edge of the barrier.

8. The battery module as claimed in claim 7, wherein, in the first wide region distances between the set of the linear members increase toward the one lateral edge of the barrier and in the narrow region a distance between the set of the linear members is constant.

9. The battery module as claimed in claim 1, wherein the sloping open area defined by the set of the linear members narrows toward another lateral edge of the barrier.

10. The battery module as claimed in claim 1, wherein the plurality of battery cells and the at least one barrier are alternately arranged along a first direction, the first direction intersecting the crosswise direction of the linear members.

11. The battery module as claimed in claim 1, wherein:
    the plurality of battery cells and the at least one barrier are alternately arranged along a first direction, and
    the plurality of sidewalls extend between a pair of the plurality of battery cells in the first direction.

12. The battery module as claimed in claim 1, wherein:
    the plurality of battery cells and the at least one barrier are alternately arranged along a first direction, and
    the plurality of sidewalls extend toward only one of the plurality of battery cells in the first direction.

13. A battery module, comprising:
    a plurality of battery cells; and
    at least one barrier, the barrier being between adjacent battery cells of the plurality of battery cells and including a plurality of linear members extending in a crosswise direction across the barrier,
    a set of the linear members defining a first passageway and a second passageway connected to the first passageway, the second passageway being narrower than the first passageway such that flow between the set of the linear members is concentrated in the second passageway.

14. The battery module as claimed in claim 13, wherein:
    the first passageway widens toward one lateral edge of the barrier, and
    the set of the linear members defines a third passageway connected to the second passageway, the second passageway being between the first and third passageways, and
    the third passageway widening toward another lateral edge of the barrier.

15. The battery module as claimed in claim 13, wherein the first passageway widens toward one lateral edge of the barrier and the second passageway is at another lateral edge of the barrier.

16. The battery module as claimed in claim 13, wherein the first passageway widens toward one lateral edge of the barrier and the second passageway is at a center of the barrier.

* * * * *